United States Patent
Gu

(10) Patent No.: US 11,699,901 B1
(45) Date of Patent: Jul. 11, 2023

(54) CONTROL METHOD AND SYSTEM FOR POWER SOURCE, AND DEVICE AND MEDIUM

(71) Applicant: INSPUR SUZHOU INTELLIGENT TECHNOLOGY CO., LTD., Jiangsu (CN)

(72) Inventor: Junjie Gu, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 17/927,934

(22) PCT Filed: Jan. 12, 2021

(86) PCT No.: PCT/CN2021/071211
§ 371 (c)(1),
(2) Date: Nov. 28, 2022

(87) PCT Pub. No.: WO2021/238234
PCT Pub. Date: Dec. 2, 2021

(30) Foreign Application Priority Data

May 29, 2020 (CN) .......................... 202010473798.7

(51) Int. Cl.
*H02J 1/08* (2006.01)
(52) U.S. Cl.
CPC .................................. *H02J 1/084* (2020.01)
(58) Field of Classification Search
CPC ....................................................... H02J 1/084
(Continued)

(56) References Cited

U.S. PATENT DOCUMENTS

| 2006/0158156 A1* | 7/2006 | Gamboa | H02J 7/00309 |
| | | | 320/141 |
| 2013/0278224 A1* | 10/2013 | Ofek | H02M 1/4233 |
| | | | 320/137 |

(Continued)

FOREIGN PATENT DOCUMENTS

| CN | 201533194 | 7/2010 |
| CN | 102457384 A | 5/2012 |

(Continued)

OTHER PUBLICATIONS

Corresponding International Patent Application No. PCT/CN2021/071211, International Search Report, dated Apr. 14, 2021.

(Continued)

*Primary Examiner* — Suresh Memula
(74) *Attorney, Agent, or Firm* — Cooper Legal Group, LLC

(57) ABSTRACT

A control method for a power source, including the following steps: detecting the electric power quality of multiple channels of inputs of a power source; in response to the electric power quality of the multiple channels of inputs being normal, acquiring and comparing the resistance of a relay when the power source is respectively working at each channel of input; in response to the resistance of the relay at each channel of input meeting a preset condition, acquiring the duration how long each power source is working at one channel of input among the multiple channels of inputs; and in response to the duration how long the power source is working at the channel of input in the multiple channels of inputs being greater than a threshold value, adjusting the power source to work at other channel of input.

20 Claims, 3 Drawing Sheets

(58) Field of Classification Search
USPC .......................................................... 320/108
See application file for complete search history.

(56) References Cited

U.S. PATENT DOCUMENTS

| | | | | |
|---|---|---|---|---|
| 2014/0333258 | A1* | 11/2014 | Matsukura | B60L 53/12 320/108 |
| 2015/0061578 | A1* | 3/2015 | Keeling | B60L 53/126 320/108 |
| 2015/0349560 | A1* | 12/2015 | Seong | H02J 7/04 320/107 |
| 2017/0012788 | A1 | 1/2017 | Rimboim et al. | |
| 2017/0154745 | A1 | 6/2017 | Hamilton | |
| 2023/0095422 | A1* | 3/2023 | Pathipati | B60L 53/36 320/108 |

FOREIGN PATENT DOCUMENTS

| | | | | |
|---|---|---|---|---|
| CN | 202268741 | U | | 6/2012 |
| CN | 103443895 | A | | 12/2013 |
| CN | 104142470 | A | | 11/2014 |
| CN | 104169833 | A | | 11/2014 |
| CN | 105305600 | A | | 2/2016 |
| CN | 205681096 | U | | 11/2016 |
| CN | 111817285 | | | 10/2020 |
| CN | 216904694 | U | * | 7/2022 |
| KR | 19990009343 | A | | 2/1999 |
| KR | 102380739 | B1 | * | 4/2022 |
| WO | WO-2021046600 | A1 | * | 3/2021 ................ H02J 3/36 |

OTHER PUBLICATIONS

Corresponding International Patent Application No. PCT/CN2021/0/1211, Written Opinion, dated Apr. 14, 2021.
Corresponding Chinese Patent Application No. CN202010473798.7, Notification to Grant Patent Right for Invention dated May 17, 2022.
Corresponding Chinese Patent Application No. CN202010473798.7, First Office Action dated Jul. 28, 2021.
Corresponding Chinese Patent Application No. CN202010473798.7, Second Office Action dated Feb. 16, 2022.

* cited by examiner

CONTROL METHOD AND SYSTEM FOR POWER SOURCE, AND DEVICE AND MEDIUM

This application claims priority to Chinese Patent Application No. 202010473798.7, filed on May 29, 2020 in China National Intellectual Property Administration and entitled "Control Method and System for Power Supply, and Device and Medium", which is hereby incorporated by reference in its entirety.

FIELD

The present application relates to the field of power sources, in particular to a control method and system for a power source, and a device and a storage medium.

BACKGROUND

As shown in FIG. 1, it is a diagram of a current power supply link designed based on a dual-input power source, PSU1, PSU2, and PSU3 work at input1 of a cabinet to supply power, PSU4, PSU5, and PSU6 work at input2 of the cabinet to supply power, a right input end of the power supply unit (PSU) in the figure is a default working channel, and through a power distribution system in the figure, two channels of inputs, i.e., input1 and input2, of the cabinet can respectively supply power to 3 PSUs. Moreover, the other channel of the PSU is in a backup state, and according to such a design method, the cabinet can be in load balance of two channels. However, the PSU always works at the default channel, and the backup channel may be backup for the entire life cycle, resulting in huge waste of device resources. Moreover, due to the double-input power source power factor controller (PFC) front-stage relay connection structure, ignition and arc discharge can be generated when the relay is electrified to attract and open, great damage is caused to electric shock, contact impedance of a relay contact can be increased when the relay is attracted and opened for a long time, and if the impedance is high, the relay is burnt due to heating. This risk is also present with a dual-input power source.

SUMMARY

In view of this, in order to overcome at least one aspect of the above problem, embodiments of the present application propose a control method for a power source, which includes the following steps:

detecting electric power quality of multiple channels of inputs of a power source;

in response to the electric power quality of the multiple channels of inputs being normal, acquiring and comparing a resistance of a relay under a circumstance that the power source is respectively working at each channel of input;

in response to the resistance of the relay at each channel of input meeting a preset condition, acquiring a duration how long each power source is working at one channel of input among the multiple channels of inputs; and in response to the duration how long the power source is working at the channel of input in the multiple channels of inputs being greater than a threshold value, adjusting the power source to work at other channel of input.

In some embodiments, the step of detecting the electric power quality of multiple channels of inputs of the power source further includes:

detecting a voltage and frequency of each channel of input; and judging whether the voltage of each channel of input is in a normal range and judging whether the frequency of each channel of input is in a normal range.

In some embodiments, the step of acquiring and comparing the resistance of the relay under the circumstance that the power source is respectively working at each channel of input further includes:

enabling the power source to respectively work at each channel of input so as to acquire a current and a voltage passing through a corresponding relay; and calculating the resistance of the corresponding relay under a circumstance that the power source is working at each channel of input according to the current and the voltage.

In some embodiments, the method further includes:

respectively comparing the resistance of the corresponding relay at each channel of input with a threshold value to judge whether the resistance of the corresponding relay at each channel of input meets the preset condition; or pairwise comparing the resistance of the corresponding relay at each channel of input to determine a resistance difference, and judge whether the resistance of the corresponding relay at each channel of input meets the preset condition according to the resistance difference.

In some embodiments, the method further includes:

in response to the electric power quality of only one channel of input among the multiple channels of inputs being normal, taking the channel of input with the normal electric power quality as an input of the power source.

In some embodiments, the method further includes:

in response to the resistance of the relay at several channels of inputs failing to meet the preset condition, taking other channel of input meeting the preset condition as an input of the power source.

In some embodiments, the step of adjusting the power source to work at other channel of input further includes:

enabling a number of power sources adjusted every time to be less than a preset value.

Based on the same inventive concept, according to another aspect of the present application, embodiments of the present application also provide a control system for a power source, which includes:

a detection module, configured to detect the electric power quality of multiple channels of inputs of a power source;

a first response module, configured to, in response to the electric power quality of multiple channels of inputs being normal, acquire and compare the resistance of a relay when the power source is respectively working at each channel of input;

a second response module, configured to, in response to the resistance of the relay at each channel of input meeting a preset condition, acquire the time when each power source is working at one channel of input among the multiple of channels of inputs; and a third response module, configured to, in response to the time when the power source is working at the channel of input among the multiple channels of inputs being greater than a threshold value, adjust the power source to work at another channel of input.

Based on the same inventive concept, according to yet another aspect of the present application, embodiments of the present application also provide a computer device, which includes:

at least one processor; and a memory, storing a computer program that is configured to run in the processor and implements, upon execution by the processor, the steps of any control method for a power source described above.

Based on the same inventive concept, according to another aspect of the present application, embodiments of the present application also provide a computer-readable storage medium, which stores a computer program that, upon execution by a processor, implements the steps of any control method for a power source described above.

The present application has any one of the following beneficial technical effects: according to the solution provided in the present application, a PSU can always be in load balance of multiple channels of inputs; moreover, by means of detecting working states and working duration of the multiple channels of inputs of a power source, the power source is switched at intervals to another channel to work after comprehensive judgement. In this way, a hardware circuit of a multi-input power source can be significantly utilized, the service life of the PSU is prolonged, and the stability of a system is improved.

BRIEF DESCRIPTION OF THE DRAWINGS

In order to describe the technical solutions in the embodiments of the present application more clearly, drawings required to be used in the prior art and the embodiments will be briefly introduced below. Apparently, the drawings in the following description are only some embodiments of the present application. Those of ordinary in the art may also obtain other drawings according to these drawings without involving any creative effort.

DETAILED DESCRIPTION

In order to make the objectives, technical solutions, and advantages of the present application more clearly understood, the embodiments of the present application will be further described in detail below with reference to certain embodiments and the drawings.

It should be noted that all expressions of "first" and "second" in the embodiments of the present application are for the purpose of distinguishing two non-identical entities or parameters with the same name. It can be seen that "first" and "second" are only for the convenience of expression and should not be construed as a limitation to the embodiments of the present application, which will be not described one by one in subsequent embodiments.

It should be noted that in the embodiments of the present application, a PSU can be designed and developed to record the time when the PSU is respectively working at each channel of input, and a PMC can read the time span of the PSU working at each channel of input through the PMbus protocol. Multiple channels of inputs may be two channels of inputs, three channels of inputs or several channels of inputs.

Figure 1:
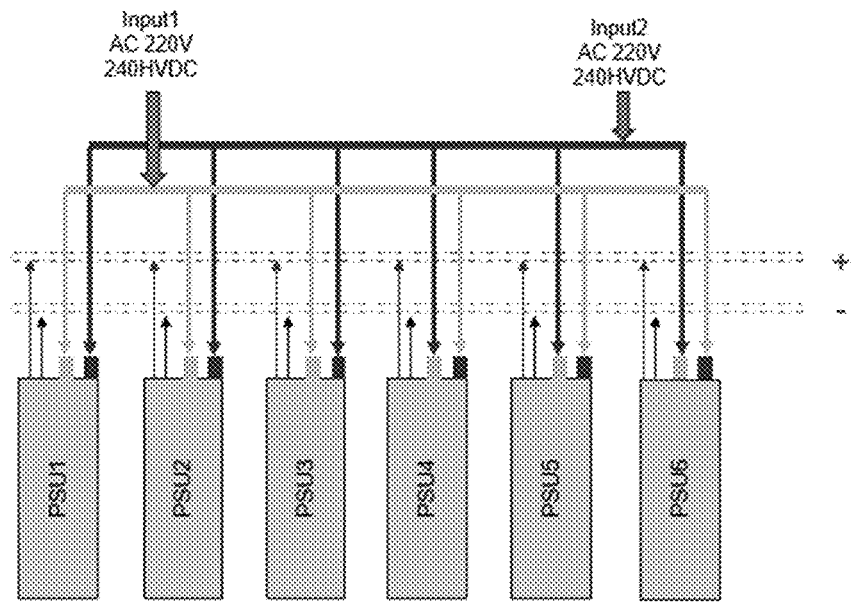
FIG. 1 is a diagram of a current power supply link designed based on a dual-input power source.
Figure 2:
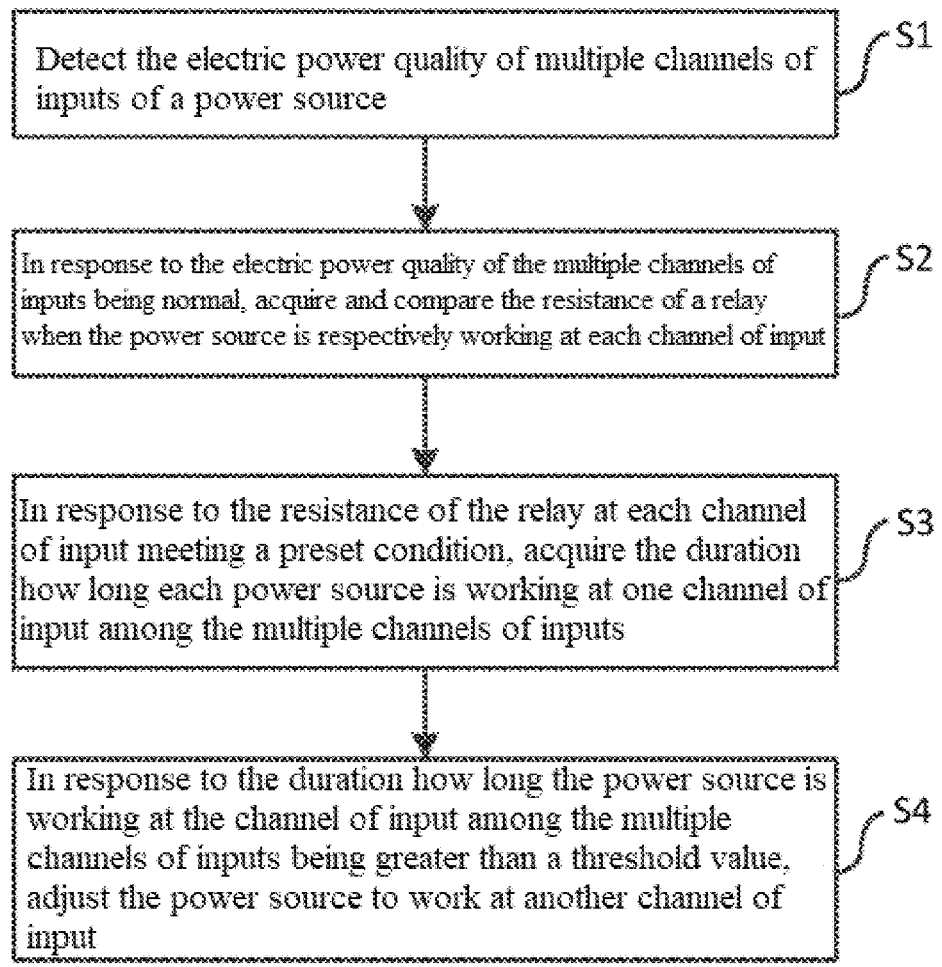
FIG. 2 is a schematic flowchart of a control method for a power source according to an embodiment of the present application.

According to a first aspect of the present application, embodiments of the present application propose a control method for a power source, as shown in FIG. 2, which includes the following steps: S1, the electric power quality of multiple channels of inputs of a power source is detected; S2, in response to the electric power quality of the multiple channels of inputs being normal, the resistance of a relay when the power source is respectively working at each channel of input is acquired and compared; S3, in response to the resistance of the relay at each channel of input meeting a preset condition, the duration how long each power source is working at one channel of input among the multiple channels of inputs is acquired; and S4, in response to the duration how long the power source is working at the channel of input among the multiple channels of inputs being greater than a threshold value, the power source is adjusted to work at other channel of input.

According to the solution proposed in the present application, a PSU can always be in load balance of multiple channels of inputs; moreover, by means of detecting working states and working duration of the multiple channels of inputs of a power source, the power source is switched at intervals to other channel to work after comprehensive judgement. In this way, a hardware circuit of a multi-input power source can be significantly utilized, the service life of the PSU is prolonged, and the stability of a system is improved.

In some embodiments, the operation in step S1 that the electric power quality of multiple channels of inputs of a power source is detected further includes the following steps:

a voltage and frequency of each channel of input are detected; and whether the voltage of each channel of input is in a normal range is judged, and whether the frequency of each channel of input is in a normal range is judged.

In some embodiments, the method further includes the following step:

in response to the electric power quality of only one channel of input among the multiple channels of inputs being normal, the channel of input with the normal electric power quality is taken as an input of the power source.

The electric power quality may be detected by a power management controller (PMC). When the PMC starts to work, it detects the electric power quality, mainly including a voltage and frequency, of multiple channels of inputs of a cabinet. A normal voltage range is 190-250 V, and a normal frequency range is 50 Hz±5%. If the PMC detects that a voltage and frequency are not in the ranges, it produces a warning log, and adjusts all power sources to work at a channel that normally supplies power at the same time. It should be noted that the normal working ranges defined by the PMC are smaller than ranges within which the power supply can work normally in order to realize a function of early warning.

In some embodiments, the operation in step S2 that the resistance of a relay when the power source is respectively working at each channel of input is acquired and compared further includes the following steps:

the power source is enabled to respectively work at each channel of input so as to acquire a current and a voltage passing through a corresponding relay; and the resistance of the corresponding relay when the power source is working at each channel of input is calculated according to the current and the voltage.

If the power supply environment of the multiple channels of inputs is normal, the PMC sends an instruction to acquire the resistance of a relay of each channel of input of each PSU. In some embodiments, a resistance acquisition instruction may be sent by the PMC, at this time, the PSUs themselves switch to one channel to work, a current and a voltage passing through both ends of the relay are detected, the resistance of the relay is calculated based on the current and the voltage, the PSUs switch to other channel of input to work in sequence. The resistance of a relay corresponding to other channel of input is obtained by the same method.

In some embodiments, the method further includes the following steps:

the resistance of the corresponding relay at each channel of input is respectively compared with a threshold value to judge whether the resistance of the corresponding relay at each channel of input meets the preset condition; or the resistance of the corresponding relay at each channel of input is pairwise compared to determine a resistance difference, and whether the resistance of the corresponding relay at each channel of input meets the preset condition is judged according to the resistance difference.

In some embodiments, the method further includes the following step:

in response to the resistance of the relay at several channels of inputs failing to meet the preset condition, other channel of input meeting the preset condition is taken as an input of the power source.

The resistance of the corresponding relay when each power source is working at each channel of input may be compared one by one, if a difference is less than or equal to 5%, it is determined that the resistance is equivalent, the power supply can work at any one channel randomly, if a difference is greater than 5%, it is determined that a resistance difference is high, the PMC needs to control the power source to work at a channel with smaller resistance. In this way, the loss can be reduced, and the service life of the multi-channel power source can be balanced to improve the stability. Then, the PMC controls a PSU with a resistance difference greater than 5% to switch to a channel with smaller resistance to work. A PSU with a resistance difference less than 5% is processed in two ways. A working state of each PSU and the duration when the PSU is working at a certain channel recently are read, the number of PSU that have been working at IN1 for more than 20 days is assumed as c, the number of PSU that have been working at IN2 for more than 20 days is assumed as d, and if both c and d are greater than 0, the PMC controls PSUs that have been working at IN1 and IN2 for the longest time to respectively switch to other channel to work.

It should be noted that, a difference less than or equal to 5% or greater than 5% may refer to a difference between the resistance of a relay corresponding to each power source and a threshold value, or may refer to a resistance difference of relays respectively corresponding to two power sources. Of course, the magnitude of a difference may be regulated as required, which may be greater than 5%, for example, if a difference is less than or equal to 6%, it is determined that the resistance is equivalent, or may be less than 5%, for example, if a difference is less than or equal to 4%, it is determined that the resistance is equivalent.

In some embodiments, the step of adjusting the power source to work at other channel of input further includes the following step:

the number of power sources adjusted every time is enabled to be less than a preset value.

1 or 2 PSUs may be controlled to switch every time, so as to reduce the risk of instability due to simultaneous switching of multiple PSUs. The PSU is periodically switched to other channel to work, thereby reducing the risk of failure to discover a circuit problem in time due to long-term inactivity of the circuit, and reducing a downtime risk due to simultaneous switching of multiple PSUs.

According to the solution proposed in the present application, the service life of the relay is judged according to the resistance, it is defined that the PSU can work for a longer time at a channel with smaller resistance, and is not involved in adjustment of load balance. In this way, the working duration of the power source can be prolonged to the largest extent, the loss of the power source itself is reduced, and the switching efficiency during working is improved.

Figure 3:
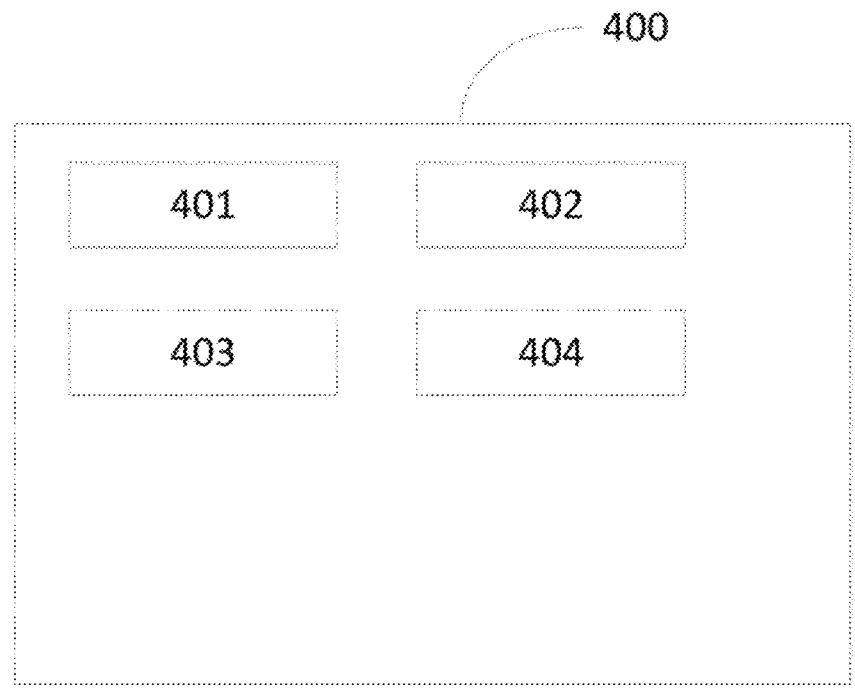
FIG. 3 is a schematic structural diagram of a control system for a power source according to an embodiment of the present application.

Based on the same inventive concept, according to another aspect of the present application, embodiments of the present application also provide a control system 400 for a power source, as shown in FIG. 3, which includes:

a detection module 401, configured to detect the electric power quality of multiple channels of inputs;

a first response module 402, configured to, in response to the electric power quality of the multiple channels of inputs being normal, acquire and compare the resistance of a relay when the power source is respectively working at each channel of input;

a second response module 403, configured to, in response to the resistance of the relay at each channel of input meeting a preset condition, acquire the time when each power source is working at one channel of input among the multiple channels of inputs; and a third response module 404, configured to, in response to the time when the power source is working at the channel of input among the multiple channels of inputs being greater than a threshold value, adjust the power source to work at another channel of input.

Figure 4:
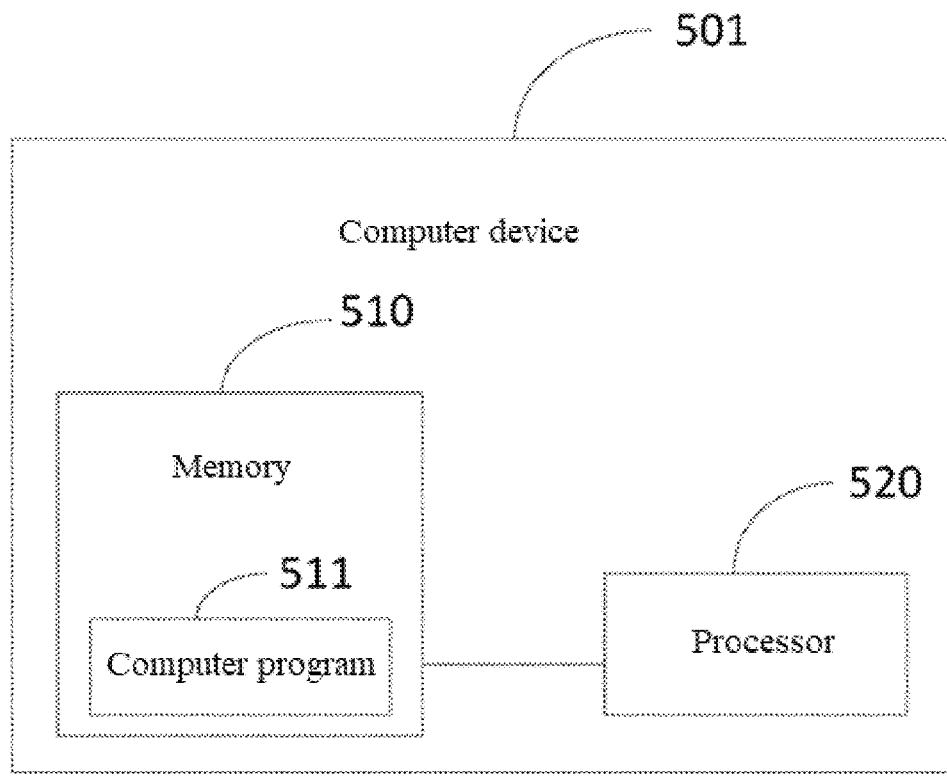
FIG. 4 is a schematic structural diagram of a computer device according to an embodiment of the present application.
Figure 5:
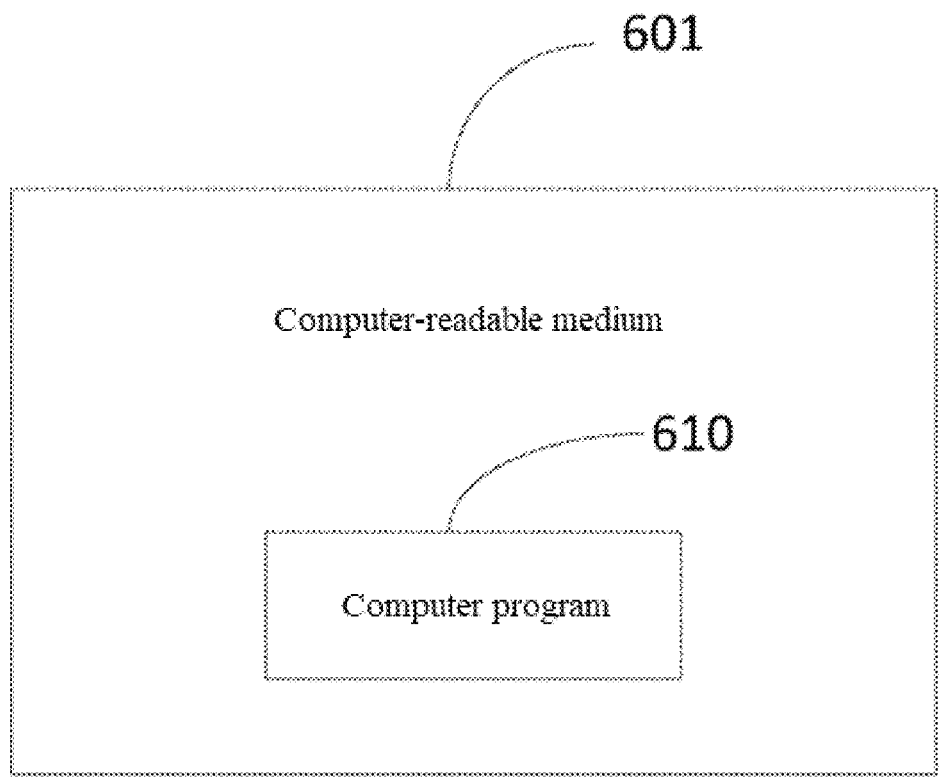
FIG. 5 is a schematic structural diagram of a computer-readable storage medium according to an embodiment of the present application.

Based on the same inventive concept, according to another aspect of the present application, as shown in FIG. 4, embodiments of the present application also provide a computer device 501, which includes:

at least one processor 520; and a memory 510, storing a computer program 511 that is configured to running in the processor and implement, upon execution by the processor 520, the steps of any control method for a power source described above.

Based on the same inventive concept, according to another aspect of the present application, as shown in FIG. 4, embodiments of the present application also provide a computer-readable storage medium 601, which stores a computer program instruction 610 that, upon execution by a processor, implements the steps of any control method for a power source described above.

Finally, it should be noted that those of ordinary skill in the art can understand and implement the whole or partial flow of the method in the above embodiments by instructing relevant hardware through a computer program, and the program may be stored in a computer-readable storage medium and implement, when executed, the flow of any method described in the above embodiments. The computer-readable storage medium may be a magnetic disk, an optical disk, a read only storage memory (ROM) or a random-access memory (RAM). Embodiments of the above computer program can achieve an effect the same as or similar to that of any corresponding method described in the above embodiments.

In addition, typically, the apparatuses, devices, etc. disclosed in the embodiments of the present application may be various electronic terminal devices such as a mobile phone, a personal digital assistant (PDA), a tablet computer (PAD), and a smart TV, and may also be large-scale terminal devices such as a server. Therefore, the scope of protection of the embodiments of the present application should not be limited to a certain type of apparatus or device. The client disclosed in the embodiments of the present application may be applied to any electronic terminal device described above in the form of electronic hardware, computer software, or a combination of the two.

In addition, the methods disclosed in the embodiments of the present application may also be implemented as a computer program executed by a CPU, and the computer program may be stored in a computer-readable storage medium. The computer program implements, when executed by the CPU, the above functions defined in the methods disclosed in the embodiments of the present application.

In addition, the steps of the method and the units of the system may also be implemented by using a controller and a computer-readable storage medium configured to store computer program that enables the controller to implement the steps or functions of the units.

In addition, it should be understood that the computer-readable storage medium (e.g., a memory) herein may be a volatile memory or a non-volatile memory, or may include a volatile memory and a non-volatile memory. By way of example and not limitation, non-volatile memories may include a read only memory (ROM), a programmable ROM (PROM), an electrically programmable ROM (EPROM), an electrically erasable programmable ROM (EEPROM), and a flash memory. Volatile memories may include a random-access memory (RAM), which may act as an external cache memory. By way of example and not limitation, RAM is available in various forms such as a synchronous RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), and a direct Rambus RAM (DRRAM). The storage devices of the disclosed aspects are intended to include, but not be limited to, these and other suitable types of memories.

Those skilled in the art will also appreciate that various exemplary logical blocks, modules, circuits, and algorithm steps described in conjunction with the disclosure herein may be implemented as electronic hardware, computer software, or a combination of the two. In order to clearly describe the interchangeability of hardware and software, functions of various exemplary components, blocks, modules, circuits, and steps have been generally described. Whether such functions are implemented as software or hardware depends on the specific application and design constraints imposed on the overall system. Those skilled in the art may implement the functions in various ways for each specific application, but such implementation decisions should not be interpreted as causing a departure from the scope of the embodiments of the present application.

The various exemplary logical blocks, modules, and circuits described in conjunction with the disclosure herein may be implemented or executed using the following components designed to perform the functions herein: a general-purpose processor, a digital signal processor (DSP), application-specific integrated circuit (ASIC), a field programmable gate array (FPGA) or other programmable logic components, discrete gate or transistor logic, a discrete hardware component, or any combination of these components. The general-purpose processor may be a microprocessor, but alternatively, the processor may be any conventional processor, controller, microcontroller, or state machine. The processor may also be implemented as a combination of computing devices, such as a combination of a DSP and a microprocessor, multiple microprocessors, one or more microprocessors in combination with a DSP, and/or any other configuration.

The steps of the method or algorithm described in conjunction with the disclosure herein may be directly implemented in hardware, a software module executed by a processor, or a combination of the two. The software module may be placed in a RAM, a flash memory, a ROM, an EPROM, an EEPROM, a register, a hard disk, a removable disk, a CD-ROM or any other form of storage medium known in the art. An exemplary storage medium is coupled to the processor to enable the processor to read information from, and write information to, the storage medium. In an alternative, the storage medium may be integrated with the processor. The processor and the storage medium may be placed in an ASIC. The ASIC may be placed in a user terminal. In an alternative, the processor and the storage medium may be placed in the user terminal as discrete components.

In one or more exemplary designs, functions may be implemented in hardware, software, firmware, or any combination thereof. If being implemented in software, these functions may be stored in a computer-readable medium or sent through a computer-readable medium as one or more instructions or codes. Computer-readable media includes computer storage media and communication media including any medium that facilitates transfer of a computer program from one place to another. The storage medium may be any available medium that can be accessed by a general-purpose or dedicated computer. By way of example and not limitation, the computer-readable media may include a RAM, a ROM, an EEPROM, a CD-ROM or other optical disk storage devices, a magnetic disk storage device or other magnetic storage devices, and any other medium that is used for carrying or storing required program codes in the form of instructions or data structures and can be accessed by a general-purpose or dedicated computer or a general-purpose or dedicated processor. In addition, any connection is properly termed a computer-readable medium. For example, if a coaxial cable, a fiber optic cable, a twisted pair, a digital subscriber line (DSL), or a wireless technology, such as infrared, radio, and microwave, are used to send software from a website, a server or other remote sources, the above coaxial cable, fiber optic cable, twisted pair, DSL or the wireless technology, such as infrared, radio, and microwave, are all included in the definition of medium. As used herein, magnetic disks and optical disks include a compact disk (CD), a laser disk, an optical disk, a digital versatile disk (DVD), a floppy disk, and a blue-ray disk, magnetic disks usually reproduce data magnetically, while optical disks reproduce data optically with lasers. Combinations of the above content should also be included within the scope of computer-readable media.

The above are exemplary embodiments of the present application, but it should be noted that various changes and modifications may be made without departing from the scope of the embodiments of the present application as defined in the claims. It is unnecessary to perform the functions, steps and/or actions of the method disclosed in the embodiments herein in any particular order. In addition, although elements disclosed in the embodiments of the present application may be described or claimed as the singular, unless explicitly limited to the singular, may also be construed the plural.

It should be understood that, as used herein, the singular form "a" is intended to include the plural form as well, unless the context clearly supports an exception. It will also be understood that "and/or" used herein is meant to include any and all possible combinations of one or more of the associated listed items.

The serial numbers of the above embodiments of the present application are only for description, and do not represent the order of excellence of the embodiments.

Those of ordinary skill in the art will understand that all or some of the steps of the above embodiments may be implemented by hardware, or may be implemented by instructing relevant hardware through a program, the program may be stored in a computer-readable storage medium, and the storage medium may be a read-only memory, a magnetic disk, an optical disk, etc.

Those of ordinary skill in the art should understand that the discussion of any of the above embodiments is only exemplary, and is not intended to imply that the scope (including the claims) of the embodiments of the present application is limited to these examples; under the idea of the embodiments of the present application, the technical features in the above embodiments or different embodiments may also be combined, and there are many other changes in different aspects of the above embodiments of the present application, which are not provided in detail for the sake of brevity. Therefore, any omission, modification, equivalent replacement, improvement, etc. made within the spirit and principles of the embodiments of the present application shall fall within the scope of protection of the embodiments of the present application.

What is claimed is:

1. A control method for a power source, comprising:
   detecting electric power quality of multiple channels of inputs of the power source;
   in response to the electric power quality of the multiple channels of inputs being normal, acquiring and comparing a resistance of a relay under a circumstance that the power source is respectively working at each channel of input;
   in response to the resistance of the relay at several channels of inputs failing to meet a preset condition, taking other channel of input meeting the preset condition as an input of the power source;
   in response to the resistance of the relay at each channel of input meeting the preset condition, acquiring a duration how long each power source is working at one channel of input among the multiple channels of inputs; and
   in response to the duration how long the power source is working at the channel of input among the multiple channels of inputs being greater than a threshold value, adjusting the power source to work at other channel of input.

2. The method according to claim 1, wherein the step of detecting the electric power quality of the multiple channels of inputs of the power source further comprises:
   detecting a voltage and frequency of each channel of input; and
   judging whether the voltage of each channel of input is in a normal range and judging whether the frequency of each channel of input is in a normal range.

3. The method according to claim 1, wherein the step of acquiring and comparing the resistance of the relay under the circumstance that the power source is respectively working at each channel of input further comprises:
   enabling the power source to respectively work at each channel of input so as to acquire a current and a voltage passing through a corresponding relay; and
   calculating the resistance of the corresponding relay under a circumstance that the power source is working at each channel of input according to the current and the voltage.

4. The method according to claim 3, further comprising:
   comparing the resistance of the corresponding relay at each channel of input with a threshold value to judge whether the resistance of the corresponding relay at each channel of input meets the preset condition; or
   pairwise comparing the resistance of the corresponding relay at each channel of input to determine a resistance difference, and judging whether the resistance of the corresponding relay at each channel of input meets the preset condition according to the resistance difference.

5. The method according to claim 1, further comprising:
   in response to the electric power quality of only one channel of input among the multiple channels of inputs being normal, taking the channel of input with the normal electric power quality as the input of the power source.

6. The method according to claim 1, wherein the step of adjusting the power source to work at other channel of input further comprises:
   enabling a number of power sources adjusted every time to be less than a preset value.

7. The method according to claim 1, further comprising:
   by means of detecting working states and working duration of the multiple channels of inputs of the power source, switching the power source at intervals to other channel to work.

8. A computer device, comprising:
   at least one processor; and
   a memory, storing a computer program that is configured to run in the at least one processor, wherein the computer program, upon execution by the at least one processor, is configured to cause the at least one processor to:
   detect electric power quality of multiple channels of inputs of a power source;
   in response to the electric power quality of the multiple channels of inputs being normal, acquire and compare a resistance of a relay under a circumstance that the power source is respectively working at each channel of input;
   in response to the resistance of the relay at several channels of inputs failing to meet a preset condition, take other channel of input meeting the preset condition as an input of the power source;
   in response to the resistance of the relay at each channel of input meeting the preset condition, acquire a duration how long each power source is working at one channel of input among the multiple channels of inputs; and
   in response to the duration how long the power source is working at the channel of input among the multiple channels of inputs being greater than a threshold value, adjust the power source to work at other channel of input.

9. The computer device according to claim 8, wherein the at least one processor, upon execution of the computer program, is further configured to:

detect a voltage and frequency of each channel of input; and judge whether the voltage of each channel of input is in a normal range and judge whether the frequency of each channel of input is in a normal range.

10. The computer device according to claim 8, wherein the at least one processor, upon execution of the computer program, is further configured to:

enable the power source to respectively work at each channel of input so as to acquire a current and a voltage passing through a corresponding relay; and calculate the resistance of the corresponding relay under a circumstance that the power source is working at each channel of input according to the current and the voltage.

11. The computer device according to claim 10, wherein the at least one processor, upon execution of the computer program, is further configured to:

compare the resistance of the corresponding relay at each channel of input with a threshold value to judge whether the resistance of the corresponding relay at each channel of input meets the preset condition; or pairwise compare the resistance of the corresponding relay at each channel of input to determine a resistance difference, and judge whether the resistance of the corresponding relay at each channel of input meets the preset condition according to the resistance difference.

12. The computer device according to claim 8, wherein the at least one processor, upon execution of the computer program, is further configured to:

in response to the electric power quality of only one channel of input among the multiple channels of inputs being normal, take the channel of input with the normal electric power quality as the input of the power source.

13. The computer device according to claim 8, wherein the at least one processor, upon execution of the computer program, is further configured to:

enable a number of power sources adjusted every time to be less than a preset value.

14. The computer device according to claim 8, wherein the at least one processor, upon execution of the computer program, is further configured to:

by means of detecting working states and working duration of the multiple channels of inputs of the power source, switch the power source at intervals to other channel to work.

15. A non-transitorycomputer readable storage medium, storing a computer program and the computer program, upon execution by a processor, is configured to cause the processor to:

detect electric power quality of multiple channels of inputs of a power source;

in response to the electric power quality of the multiple channels of inputs being normal, acquire and compare a resistance of a relay under a circumstance that the power source is respectively working at each channel of input;

in response to the resistance of the relay at several channels of inputs failing to meet a preset condition, take other channel of input meeting the preset condition as an input of the power source;

in response to the resistance of the relay at each channel of input meeting the preset condition, acquire a duration how long each power source is working at one channel of input among the multiple channels of inputs; and in response to the duration how long the power source is working at the channel of input among the multiple channels of inputs being greater than a threshold value, adjust the power source to work at other channel of input.

16. The non-transitory computer readable storage medium according to claim 15, wherein the computer program, upon execution by the processor, is further configured to cause the processor to:

detect a voltage and frequency of each channel of input; and judge whether the voltage of each channel of input is in a normal range and judge whether the frequency of each channel of input is in a normal range.

17. The non-transitory computer readable storage medium according to claim 15, wherein the computer program, upon execution by the processor, is further configured to cause the processor to:

enable the power source to respectively work at each channel of input so as to acquire a current and a voltage passing through a corresponding relay; and calculate the resistance of the corresponding relay under a circumstance that the power source is working at each channel of input according to the current and the voltage.

18. The non-transitory computer readable storage medium according to claim 17, wherein the computer program, upon execution by the processor, is further configured to cause the processor to:

compare the resistance of the corresponding relay at each channel of input with a threshold value to judge whether the resistance of the corresponding relay at each channel of input meets the preset condition; or pairwise compare the resistance of the corresponding relay at each channel of input to determine a resistance difference, and judge whether the resistance of the corresponding relay at each channel of input meets the preset condition according to the resistance difference.

19. The non-transitory computer readable storage medium according to claim 15, wherein the computer program, upon execution by the processor, is further configured to cause the processor to:

in response to the electric power quality of only one channel of input among the multiple channels of inputs being normal, take the channel of input with the normal electric power quality as the input of the power source.

20. The non-transitory computer readable storage medium according to claim 15, wherein the computer program, upon execution by the processor, is further configured to cause the processor to:

enable a number of power sources adjusted every time to be less than a preset value.

* * * * *